Aug. 26, 1930.  C. E. RUF  1,774,157
ARM ATTACHMENT FOR INDICATORS
Filed Jan. 27, 1930

INVENTOR.
Christian Eugene Ruf.
BY
John Thompson
ATTORNEY.

Patented Aug. 26, 1930

1,774,157

UNITED STATES PATENT OFFICE

CHRISTIAN EUGENE RUF, OF POUGHKEEPSIE, NEW YORK, ASSIGNOR TO STANDARD GAGE COMPANY, INC., OF POUGHKEEPSIE, NEW YORK, A CORPORATION OF NEW YORK

ARM ATTACHMENT FOR INDICATORS

Application filed January 27, 1930. Serial No. 423,696.

The present invention relates to a dial indicator gauge of that class which is employed in the checking of measurements, and relates more particularly to that style of dial indicator designed to be mounted or held in some suitable manner to a standard or fixture, and brought into contact with the article to be measured or checked.

While the device is somewhat in the form of an attachment, it may be incorporated into the original design of the dial indicator, and will in no way interfere with the usual method of using the same.

In dial indicators of this kind the indicating hand is operated by a contact plunger through a train of gears; the end of the plunger being brought into contact with the object to be gauged, while in the device herewith shown and described there is added thereto a side lever or arm, designed to be depressed by the operator for the purpose of slightly raising the plunger during the time of locating the gauge and before contact is made with the article to be gauged; thus when the indicator is mounted to a fixture as employed in production work, a more accurate reading can be had by raising the plunger clear of the article before making the contact.

The object of the invention is to provide an arm or lever attachment for dial indicator gauges, whereby the indicating or recording mechanism may be operated by the depressing of said arm.

Another object of the invention is to provide a simple, durable and efficient device for this purpose, which shall consist of few parts, and those readily adaptable to the usual design of dial indicator gauge.

Still another object is to provide a gauging means whereby due to the length or leverage of the work contact member, the indicator is very sensitive, and produces a very accurate gauge.

A further object is to provide a finger operated lever whereby the contact plunger may be raised without having to push inward on the end of the plunger.

With these and other objects in view, my invention consists in certain construction and combination of parts as will hereinafter be fully described and claimed and illustrated in the accompanying drawings which form a part hereof and in which like figures of reference refer to corresponding parts in all of the views, and it is to be understood that slight changes may be made without departing from the spirit of the invention.

In the drawings:—

Referring to the drawings:—

Figure 1:
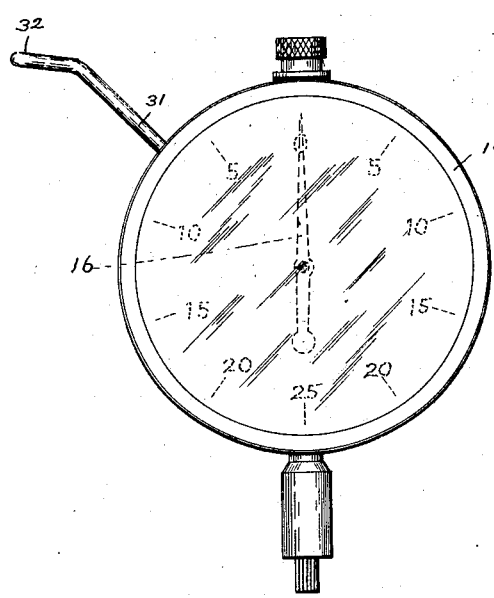
Figure 1 is a front view of an indicator gauge of the dial type, and shows the side operating lever attached thereto.
Figure 2:
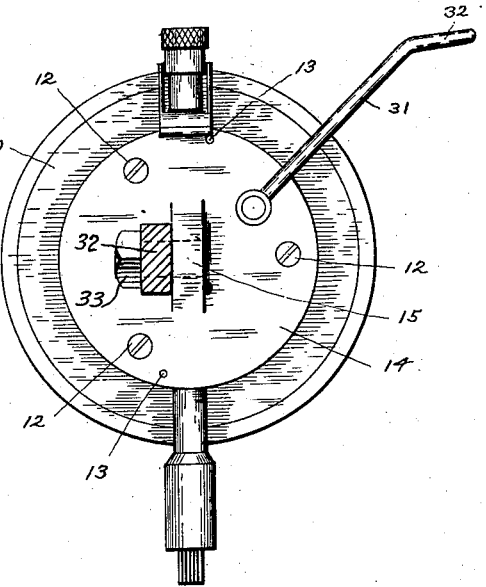
Figure 2 is a rear view of the same.
Figure 3:
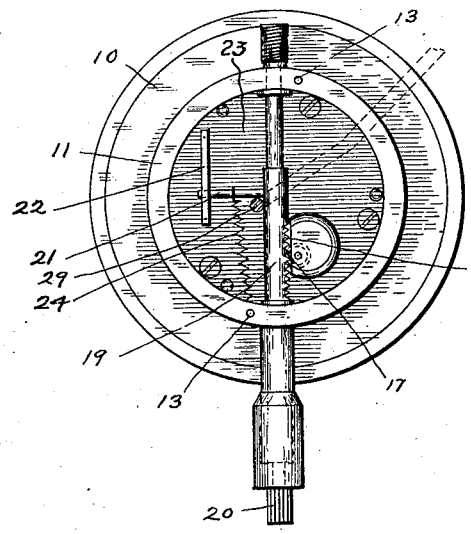
Figure 3 is a similar rear view, but with the back plate, dial lock and cap removed.
Figure 4:
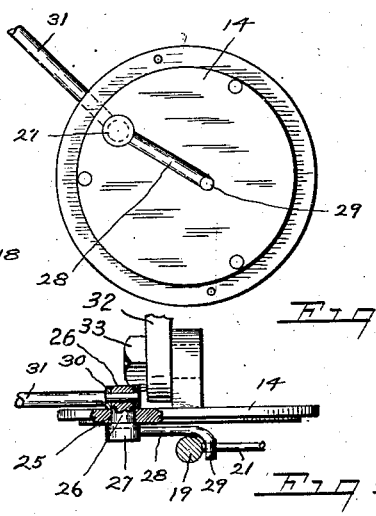
Figure 4 is a view of the inner side of the back plate, showing the operating lever attached thereto.
Figure 5:
Figure 5 is an edge view of the same, partly in section.

A well known type of dial indicator is indicated by the numeral 10, and is provided with the body portion 11 to which is secured by the screws 12 and the dowl pins 13 the back plate 14 which is formed with a mounting lug 15, by which the gauge may be attached to a stand or other object.

The indicating hand 16 is operated in the usual manner through a train of gears from the pinion 17 which is rotated by the rack 18 on the plunger 19 as actuated by the contact end 20 when brought into contact with the article to be measured.

The plunger 19 is held from rotation by an arm 21 secured thereto and sliding within a guide 22 attached to the casing 23; a spring 24 being attached to said arm 21 and the case or body portion 11 to retain the plunger in a zero position.

At a suitable location, the back plate 14 is formed with a bearing 25 within which is rotatably mounted a stud 26, which is formed with a head 27 adjacent the inner face of said back plate 14, and to this head 27 at right angles to the axis thereof is secured an arm 28 which is formed with a hooked end 29, and adapted to engage the lower side of the arm 21 adjacent to its juncture with the plunger 19, and adapted to raise said plunger 19 by the movement of the arm 21 upward.

On the outer end of said stud 26 and adjacent to the outer face of the back plate 14 is placed a collar 30, and through this collar 30 and also the end of the stud 14 is secured the inner end of the finger lever 31 which extends outward and upward from the side of the gauge and which is slightly bent as at 32.

It will thus be seen that, the dial indicator having been attached by the lug 15 to some suitable stand or fixture 32, by a screw 33, the operator by depressing the end 32 of the finger lever will be the action of said lever through the stud 27 and arm 28 coacting with the arm 21 raise the plunger 19 slightly before the same is brought into contact with the work to be gauged.

It is also understood that a number of dial indicators may be mounted upon a fixture or other support and all operated through a single finger lever by suitable arms attached to the studs and connected by a rod together; also if desired the finger lever may be made detachable from the stud.

Having thus described my invention, what I claim as new and desire to secure by Letters Patent, is:—

1. In combination with a dial indicator of the class described, including a back, of a finger operated lever pivoted to said back and projecting from the side of said indicator, and means actuated by said finger lever for operating the indicating mechanism of said indicator.

2. A lever operating means for dial gauges, comprising in combination with a dial gauge including indicating mechanism and a back plate, of a finger lever pivoted to said back plate, and means actuated by said lever and coacting with the indicating mechanism to operate the same.

3. In a dial indicator of the class described including indicating mechanism, a contact plunger and a back plate, of a finger lever for receding said plunger, comprising a stud pivoted in said back plate, a finger lever secured thereto adjacent the outer face of said back plate and projecting therefrom, an arm secured to said stud adjacent the inner face of said back plate, a hooked end formed thereon and adapted to engage with and raise said plunger.

In testimony whereof I affix my signature.

CHRISTIAN EUGENE RUF.